United States Patent
Toyota

(10) Patent No.: US 8,198,867 B2
(45) Date of Patent: Jun. 12, 2012

(54) CHARGING CONTROL METHOD FOR SECONDARY BATTERY AND BATTERY CHARGER

(75) Inventor: Masayoshi Toyota, Toyohashi (JP)

(73) Assignee: Panasonic EV Energy Co., Ltd., Kosai-shi (JP)

(*) Notice: Subject to any disclaimer, the term of this patent is extended or adjusted under 35 U.S.C. 154(b) by 336 days.

(21) Appl. No.: 12/701,442

(22) Filed: Feb. 5, 2010

(65) Prior Publication Data

US 2010/0244777 A1   Sep. 30, 2010

(30) Foreign Application Priority Data

Mar. 30, 2009 (JP) ................................. 2009-083230

(51) Int. Cl.
*H02J 7/04* (2006.01)
*H02J 7/00* (2006.01)
*G01N 27/416* (2006.01)

(52) U.S. Cl. ......... 320/148; 320/132; 324/429; 324/433
(58) Field of Classification Search .................... 320/148
See application file for complete search history.

(56) References Cited

U.S. PATENT DOCUMENTS

| 6,344,732 | B2* | 2/2002 | Suzuki | 320/132 |
| 2002/0014879 | A1* | 2/2002 | Koike et al. | 320/133 |
| 2005/0017685 | A1* | 1/2005 | Rees et al. | 320/132 |
| 2006/0279289 | A1* | 12/2006 | Denning | 324/427 |

FOREIGN PATENT DOCUMENTS

| JP | 8-17477 A | 1/1996 |
| JP | 2001-351698 A | 12/2001 |

\* cited by examiner

*Primary Examiner* — M'Baye Diao
(74) *Attorney, Agent, or Firm* — Christensen O'Connor Johnson Kindness PLLC

(57) ABSTRACT

A method and a charger for auxiliarily charging a secondary battery to a desired SOC with high accuracy. A charger for a secondary battery includes a charge termination condition storing unit which stores a relationship between open circuit voltages OCV of a plurality of secondary batteries and an amount of change of terminal voltage ΔV until a desired state of charge SOC is reached, which is previously created. A target terminal voltage Vmap at the time of the auxiliary charge is calculated by adding the amount of change of terminal voltage ΔV corresponding to the open circuit voltage OCV of a secondary battery to be auxiliarily charged to the open circuit voltage OCV which is measured. A terminal voltage Vb of the secondary battery at the time of auxiliary charge and the target terminal voltage Vmap are compared to each other by a comparison unit, and when the target terminal voltage Vmap is reached, auxiliary charge is terminated.

8 Claims, 8 Drawing Sheets

CHARGING CONTROL METHOD FOR SECONDARY BATTERY AND BATTERY CHARGER

PRIORITY INFORMATION

This application claims priority to Japanese Patent Application No. 2009-083230, filed on Mar. 30, 2009, which is incorporated herein by reference in its entirety.

BACKGROUND

1. Technical Field

The present invention relates to a charging control method for a secondary battery and a battery charger, and more particularly to technology for charging a secondary battery such that a desired state of charge (SOC) can be obtained.

2. Background Art

Secondary batteries such as nickel-metal hydride batteries and lithium ion batteries have been installed in motor-driven vehicles including hybrid electric vehicles, electric vehicles, and so on, as a power source. Although the secondary batteries are shipped from factories in a fully-charged state or a desired state of charge (e.g. SOC=60%), the capacities of the batteries are reduced due to self discharge when the batteries are left in storages and so on for a relatively long time period. In such a case, it is necessary to perform periodic auxiliary charge, and highly accurate auxiliary charge which enables a desired state of charge (e.g. SOC=60%) is desirable.

JP 2001-351698 A concerns technology regarding a lead-acid battery, and discloses measuring an open-circuit voltage OCV at the time of discharge of a storage battery to calculate the state of charge SOC based on a relationship between the OCV and the SOC which has been preset, and charging the storage battery based on the calculated SOC such that a desired SOC can be achieved.

JP 8-17477 A discloses estimating the capacity of a secondary battery by measuring a battery voltage obtained when the secondary battery is charged with a predetermined charging current, based on a relationship in which, when the charging current is the same, the smaller the capacity of a battery, the more the battery voltage increases. This document also discloses estimating the capacity of a secondary battery by measuring a battery voltage obtained when the secondary battery is discharged by a predetermined discharging current, based on a relationship in which, when the discharging current is the same, the smaller the capacity of a battery, the more the battery voltage decreases.

However, in the case of calculating the SOC based on the relationship between the OCV and the SOC and performing auxiliary charge based on the calculated SOC, the following problem arises. Specifically, as this technology is based on the precondition that SOC is calculated in a highly accurate manner based on the OCV, it is not possible to perform auxiliary charge to a desired SOC when the calculation accuracy of the SOC is lowered. In particular, when the SOC which is calculated based on the OCV is lower than the actual SOC, auxiliary charge is continued based on this low SOC, resulting in overcharge of the secondary battery. Although there exists a certain relationship between the OCV and the SOC in the initial state (immediately after manufacturing), it is likely that such a relationship is significantly affected by the history of usage of the secondary battery, and particularly by the temperature of the battery during storage when the battery is stored for a long period of time.

FIG. 6 illustrates, with marks ●, a relationship between an OCV value (an OCV value before start of charge, [V]) and an SOC value (a capacity value before charge, [Ah]), when a plurality of secondary batteries are stored under various storage conditions. Each secondary battery is charged with a constant current (e.g. 1 A) by an appropriate amount under a predetermined environment, and is then discharged to a predetermined discharge termination voltage per cell (e.g. 1.0V for a nickel-metal hydride battery). Based on the discharge capacity and the charge capacity associated with this charging and discharging, the SOC value (a capacity value before charge) is calculated. The various storage conditions specifically include various storage temperatures of 0° C., 25° C., and 45° C., respectively. By plotting pairs of OCV values and SOC values and applying first-order approximation by using a least-square method, the following can be obtained:

$$y=7.2028x-54.21$$

wherein x is an OCV value (OCV value before start of charge, [V]) and y is an SOC value (capacity value before charge, [Ah]), and a correlation coefficient is $R^2=0.6432$.

Further, FIG. 6 also illustrates actual SOC values (%), by plotting the values with marks ■, in a case in which auxiliary charge is performed from the SOC value (capacity value before charge, Ah) which is calculated from this approximation line until a desired SOC value (SOC in the initial state=60%, which corresponds to 3.9 Ah) is obtained. As illustrated in FIG. 6, even when auxiliary charge is performed based on the SOC value (capacity value before charge, Ah) obtained by calculation from the approximation line, the actual SOC value (%) does not necessarily match SOC=60%, and varies between 49.9% and 72.2%.

As described above, even when the SOC (capacity value before charge, Ah) is calculated based on the relationship between the OCV (an OCV value before start of charge) and the SOC (capacity value before charge, Ah) and auxiliary charge is performed based on the calculated SOC, it is difficult to perform highly accurate auxiliary charge with respect to all the secondary batteries stored in various temperature conditions.

On the other hand, FIG. 7 illustrates, with marks ●, a relationship between an OCV value (an OCV value before start of charge, [V]) and the actual SOC (%) when auxiliary charge is performed until the terminal voltage of 8.43V (a terminal voltage value corresponding to SOC=60% in the initial state) is reached, in a case in which a plurality of secondary batteries are stored under various storage conditions. Each secondary battery is charged with a constant current (e.g. 1 A) by an appropriate amount under a predetermined environment, and is then discharged to a predetermined discharge termination voltage per cell (e.g. 1.0V for a nickel-metal hydride battery). Based on the discharge capacity and the charge capacity associated with this charging and discharging, the SOC value (a capacity value before charge, Ah) is calculated. An amount of charging electricity to the voltage of 8.43V is added to the SOC value thus calculated to calculate the SOC value (%) when reaching 8.43V. FIG. 7 also illustrates, with marks ♦, a relationship between an OCV value (an OCV value before start of charge, [V]) and the amount of charging electricity when auxiliary charge is performed until the terminal voltage of 8.43V is reached. As illustrated in FIG. 7, even when auxiliary charge is performed until the terminal voltage reaches a predetermined value (8.43V in this case) based on a precondition that there is a certain relationship between the terminal voltage and SOC, the actual SOC value does not necessarily match SOC=60%, and varies between 49.6% and 72.8%. One of the causes of such a variation can be considered to be various relationships between the terminal voltage and the SOC depending on different storage conditions of the secondary battery.

FIG. 8 illustrates relationships between the SOC and the terminal voltage when auxiliary charge is performed after the secondary battery is stored under various storage temperature conditions. In FIG. 8, the battery capacity value corresponds to SOC (Ah), and 3.9 Ah corresponds to SOC=60%. Here, the storage temperatures and the charging conditions at the time of auxiliary charge are as follows:

(1) Store at 25° C. and auxiliary charge at 25° C.
(2) Store at 25° C. and auxiliary charge at 30° C.
(3) Store at 25° C. and auxiliary charge at 20° C.
(4) Store at 25° C. and auxiliary charge at 35° C.
(5) Store at 25° C. and auxiliary charge at 15° C.
(6) Store at 45° C. and auxiliary charge at 25° C.
(7) Store at 0° C. and auxiliary charge at 25° C.

As can be understood from FIG. 8, when the storage temperatures vary, the terminal voltage corresponding to SOC=60% also varies and is not determined uniquely. As such, because the relationship between the terminal voltage and the SOC can vary, it is difficult to obtain desired SOC even when auxiliary charge is performed based on the terminal voltage.

SUMMARY

The present invention provides a method and an apparatus which enable highly accurate auxiliary charge to a desired SOC even when a secondary battery is stored under various temperature conditions.

In accordance with an aspect of the present invention, there is provided a method of controlling charge of a secondary battery, including measuring an open circuit voltage OCV of the secondary battery before start of charge; calculating a target terminal voltage Vmap based on a relationship between open circuit voltages OCV of a plurality of secondary batteries and an amount of change of terminal voltage ΔV until a desired state of charge SOC is reached, which is previously created and stored in a memory, and the open circuit voltage OCV which is measured; starting charge of the secondary battery; comparing a terminal voltage Vb of the secondary battery after start of charge of the secondary battery with the target terminal voltage Vmap; and continuing the charge until the terminal voltage Vb of the secondary battery reaches the target terminal voltage Vmap, and terminating the charge when the terminal voltage Vb of the secondary battery reaches the target terminal voltage Vmap.

In one embodiment of the present invention, the target terminal voltage Vmap is calculated by adding the amount of change of terminal voltage ΔV corresponding to the open circuit voltage OCV which is measured, to the open circuit voltage OCV which is measured.

In another embodiment of the present invention, the relationship is created by using a plurality of secondary batteries stored under various temperature conditions.

In a further embodiment of the present invention, the relationship is created by charging a plurality of secondary batteries stored under various temperature conditions to a desired state of charge SOC under different temperature conditions, respectively.

In accordance with another aspect, there is provided a charger for charging a secondary battery, the charger including a storage unit which stores a relationship between open circuit voltages OCV of a plurality of secondary batteries and an amount of change of terminal voltage ΔV until a desired state of charge SOC is reached, which is previously created; an operation unit which calculates a target terminal voltage Vmap based on an open circuit voltage OCV before start of charge of a secondary battery to be auxiliarily charged and the relationship stored in the storage unit; a unit which compares a terminal voltage Vb of the secondary battery after start of the charge with the target terminal voltage Vmap; and a control unit which continues charge until the terminal voltage Vb of the secondary battery reaches the target terminal voltage Vmap, and terminates the charge when the terminal voltage Vb of the secondary battery reaches the target terminal voltage Vmap.

According to the present invention, it is possible to perform highly accurate auxiliary charge to a desired SOC even when a secondary battery is stored under various temperature conditions.

BRIEF DESCRIPTION OF THE DRAWINGS

A preferred embodiment of the present invention will be described in detail based on the following figures, wherein.

DETAILED DESCRIPTION

A preferred embodiment of the present invention will be described in detail with reference to the accompanying drawings.

Figure 1:
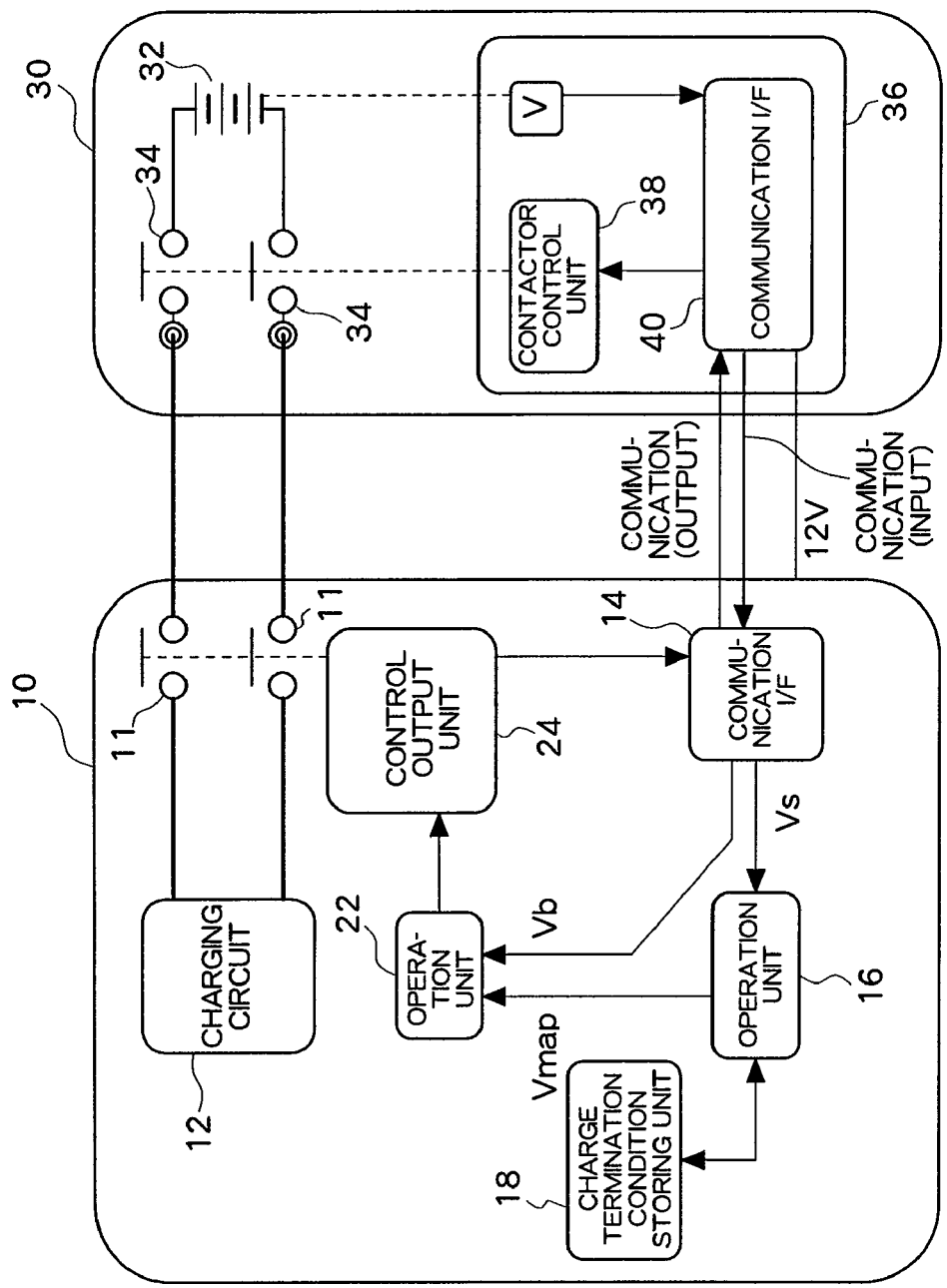
FIG. 1 is a block diagram illustrating a structure of a charger according to an embodiment of the present invention.

FIG. 1 is a block diagram illustrating a structure of an auxiliary charger for a secondary battery according to the embodiment of the present invention. An auxiliary charger 10 includes a contactor 11, a charging circuit 12, a communication interface I/F 14, an operation unit 16, a charge termination condition storing unit 18, a comparison unit 22, and a control output unit 24.

FIG. 1 also illustrates a battery pack 30 to be auxiliarily charged by the auxiliary charger 10. Briefly, the battery back 30 includes a secondary battery 32, contactors 34, and a battery ECU 36.

The battery ECU 36 further includes a contactor control unit 38 which controls the ON and OFF states of the contactors 34, and a communication interface I/F 40 which receives, as inputs, the OCV, the terminal voltage, and the temperature of the secondary battery 32, and transmits the inputs as communication data to the auxiliary charger 10.

The secondary battery 32 is composed of a plurality of battery blocks connected in series. Each battery block is formed of a plurality of battery modules electrically connected in series, and each battery module is formed of a plurality of (e.g. six) cells electrically connected in series. Each cell is a nickel-metal hydride battery or a lithium ion battery.

The battery pack is mounted in a motor-driven vehicle such as a hybrid electric vehicle and an electric vehicle. However, because the battery pack is installed in such a motor-driven vehicle after elapse of a predetermined period of time during which the battery pack is stored in a storage and elsewhere, in addition to the period of time required for transportation, after shipment from a factory, the SOC is reduced by self discharge during transportation and storage. Here, the temperature conditions under which the battery is stored are arbitrary. The auxiliary charger is used to auxiliarily charge the battery pack 30 which has undergone self discharge to a desired SOC.

On the other hand, in the structure of the auxiliary charger 10, the communication interface I/F 14 performs data transmission/reception with respect to the communication interface I/F 40 on the battery pack 30 side. The communication interface I/F 14, when the battery pack 30 is connected to the auxiliary charger 10, receives voltage data transmitted from the communication interface I/F 40. It is also possible that the communication interface I/F 14 transmits a request command to the battery ECU 36 and receives the voltage data returned from the communication interface I/F 40 of the battery ECU 36 in accordance with this request command. The communication interface I/F 14, receiving Vs which is an open circuit voltage OCV of the secondary battery 32 before start of auxiliary charge, outputs this data to the operation unit 16. Further, the communication interface I/F 14, receiving Vb which is a terminal voltage at the time of execution of auxiliary charge, outputs this data to the comparison unit 22. The OCV of the secondary battery 32 and the voltage Vb at the time of charge are detected by voltage sensors provided at predetermined positions of the secondary battery 32, and supplied to the battery ECU 36. The voltage sensor detects the voltage of the secondary battery 32 at predetermined intervals and detects at least the open circuit voltage OCV before start of auxiliary charge, and, after start of auxiliary charge, detects the terminal voltage Vb of the secondary battery 32 at predetermined intervals.

The charge termination condition storing unit 18 is a nonvolatile memory such as a flash memory and stores a relationship between the OCV before start of charge and an amount of change in the terminal voltage until the desired SOC (SOC=60%) is reached, which is previously created in the form of a map or a first-order approximation formula. This relationship can be obtained by actually supplying auxiliary charge to secondary batteries which have been stored during a predetermined period under a plurality of storage temperature conditions, and will be described in further detail below.

The operation unit 16, based on Vs, which is the OCV before start of auxiliary charge, supplied from the communication interface I/F 14, accesses the charge termination condition storing unit 18 to read, from a map or a first-order approximation formula which is stored therein, a voltage change $\Delta V$ corresponding to the Vs, and further adds this voltage change $\Delta V$ to the OCV before start of auxiliary charge to calculate a target terminal voltage Vmap=Vs+$\Delta V$, which is then output to the comparison unit 22.

The comparison unit 22 compares the terminal voltage Vb at the time of auxiliary charge, which is supplied from the communication interface I/F 14, with the target terminal voltage Vmap which is supplied from the operation unit 16, to determine whether or not both values are identical to each other. If the two values are not identical, auxiliary charge is continuously executed. If the two values are identical, that is, when the terminal voltage Vb reaches the target terminal voltage Vmap, the comparison unit 22 outputs an auxiliary charge stop signal to the control output unit 24.

Here, while the operation unit 16 and the comparison unit 22 are illustrated as separate function blocks in FIG. 1, the operation unit 16 and the comparison unit 22 may be integrally formed as an operation and comparison unit. In this case, the OCV before start of auxiliary charge and the terminal voltage Vb after start of the auxiliary charge of the secondary battery 32 are supplied from the communication interface I/F 14 to this operation and comparison unit, which then calculates the target terminal voltage Vmap based on the OCV and compares the terminal voltage Vt with the target terminal voltage Vmap. The operation unit 16, the comparison unit 22, or the operation and comparison unit, are formed of a microcomputer.

The control output unit 24, when the battery pack 30 is connected to the auxiliary charger 10 and a charge start switch which is not illustrated is turned on, controls the contactor 11 ON and also outputs an auxiliary charge start instruction to the communication interface I/F 14. The communication interface I/F 14 then transmits the auxiliary charge start instruction to the communication interface I/F 40. The communication interface I/F 40 further supplies the auxiliary charge start instruction which is received to the contactor control unit 38, which, based on the auxiliary charge start instruction, then controls the contactor 34 ON to start the auxiliary charge.

Also, the control output unit 24, when receiving the auxiliary charge stop instruction from the comparison unit 22, controls the contactor 11 OFF to terminate the auxiliary charge. The control output unit 24 further outputs the auxiliary charge stop instruction to the communication interface I/F 14. The communication interface I/F 14 then transmits the auxiliary charge stop instruction to the communication interface I/F 40, which then supplies the auxiliary charge stop instruction which is received to the contactor control unit 38. The contactor control unit 38, based on the auxiliary charge stop instruction, controls the contactor 34 OFF.

With the structure described above, the procedure for performing auxiliary charge of the secondary battery 32 of the battery pack 30 will be described.

When performing auxiliary charge with respect to the secondary battery 32 of the battery pack 30 to a desired SOC, the battery pack 30 is connected to the auxiliary charger 10 and a charge switch, which is not illustrated, provided in the auxiliary charger 10 is turned ON. Obviously, it is possible to configure so that a switch which detects physical connection of the battery pack 30 to the auxiliary charger 10 automatically controls the charge switch ON.

When the charge switch of the auxiliary charger 10 is turned ON, an operating power of 12V is supplied from the auxiliary charger 10 to the battery ECU 36 of the battery pack 30 to cause the battery ECU 36 to start operating. The battery ECU 36 receives Vs which is an OCV before start of auxiliary charge of the secondary battery 32 from the voltage sensor provided in the secondary battery 32. The Vs of the secondary battery 32 is then supplied to the auxiliary charger 10 via the communication interface I/F 40 and the communication interface I/F 14.

The operation unit 16, based on the Vs which is supplied, reads an amount of voltage change $\Delta V$ corresponding to this Vs by using the relationship which is previously created and stored in the charge termination condition storing unit 18, and further calculates the target terminal voltage Vmap using Vmap=Vs+$\Delta V$. The target terminal voltage Vmap thus calculated is supplied to the comparison unit 22.

After calculation of the target terminal voltage Vmap, the contactor 11 and the contactor 34 are turned ON by the control output unit 24 and the contactor control unit 38, respectively, to start auxiliary charge by the charging circuit 12.

Once the auxiliary charge is started, the terminal voltage Vb of the secondary battery 32 which is being auxiliarily charged is supplied to the auxiliary charger 10 at predetermined intervals. The comparison unit 22 compares the terminal voltage Vb during execution of auxiliary charge with the target terminal voltage Vmap. As long as the two voltage values are not identical, i.e. Vmap=Vp, the auxiliary charge is continuously executed. When the two voltage values are identical, i.e. Vmap=Vb, on the other hand, the contactor 11 and the contactor 34 are turned OFF by the control output unit 24 and the contactor control unit 38, respectively, to terminate the auxiliary charge.

In this manner, the secondary battery 32 of the battery pack 30 is auxiliarily charged to the desired SOC.

As described above, the auxiliary charger according to the present embodiment stores a relationship between the OCV before start of charge and an amount of voltage change $\Delta V$ corresponding to this OCV in the form of a map or a first-order approximation formula, and calculates the target terminal voltage which terminates the auxiliary charge by using this relationship. The applicant of the present application performed auxiliary charge with respect to a plurality of secondary batteries which had been stored at various storage temperatures, and found that there is a fixed relationship between the OCV before start of auxiliary charge and the amount of voltage change $\Delta V$ until the desired SOC is reached, and also found that this relationship has a high correlation irrespective of the storage temperatures at the time of storage.

Figure 2:
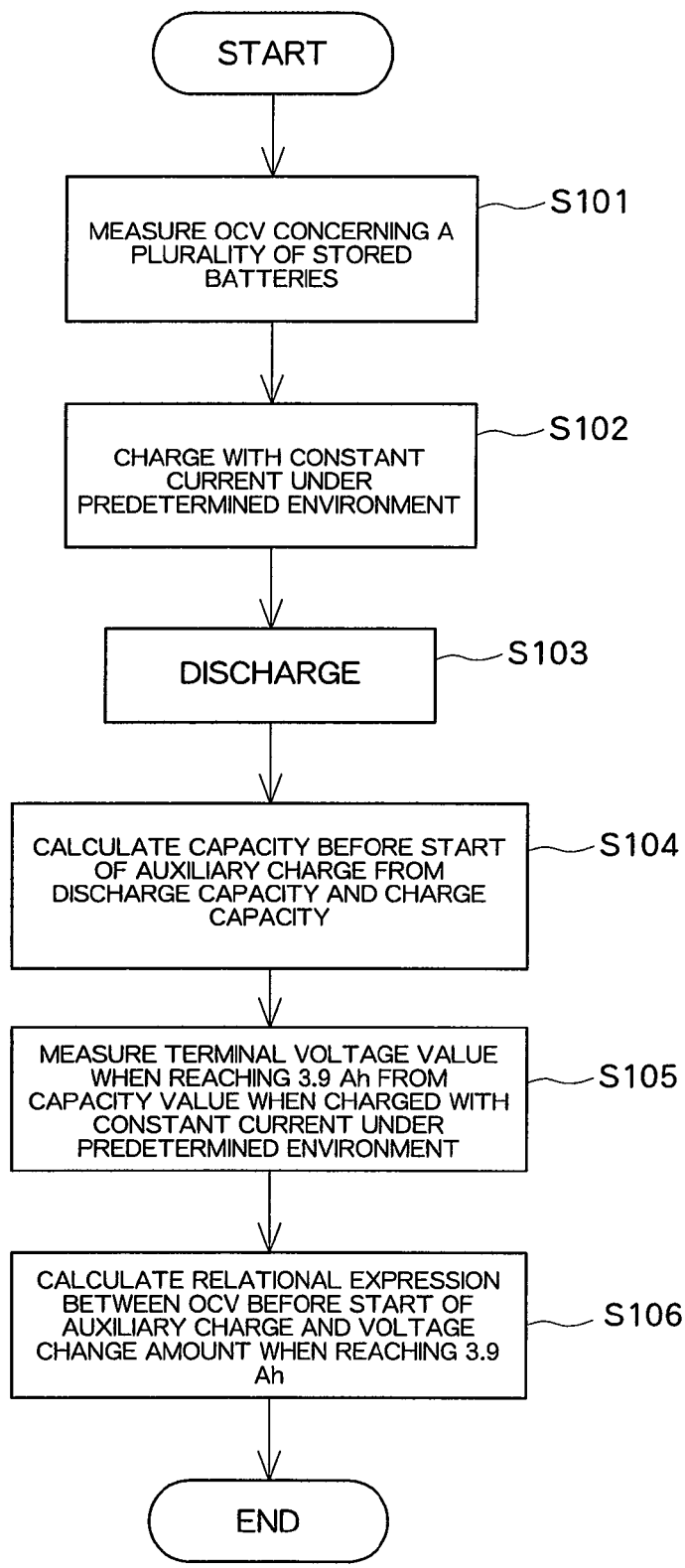
FIG. 2 is a flowchart of processing according to the embodiment of the present invention.

FIG. 2 illustrates a processing flowchart for calculating a relationship between the OCV before auxiliary charge and the amount of voltage change $\Delta V$. First, the OCV is measured with respect to each of a plurality of secondary batteries which were stored (for six months, for example) under various storage temperature conditions (S101).

Then, each secondary battery is charged by an appropriate amount with a constant current (e.g. 1 A) under the predetermined environment (S102), and is thereafter discharged to a predetermined discharge termination voltage per cell (e.g. 1.0V in the case of a nickel-metal hydrogen battery) (S103).

Based on the discharging capacity and the charging capacity associated with this charge and discharge, the SOC (Ah) of the secondary battery before start of auxiliary charge is calculated (S104).

Next, under the predetermined environment, the terminal voltage at the time of reaching 3.9 Ah (corresponding to SOC=60%) from this SOC value (Ah) when the secondary battery is charged by an appropriate amount with a constant current (e.g. 1 A) is measured (S105).

As described above, the OCV before start of auxiliary charge and an amount of voltage change $\Delta V$ of the terminal voltage until the desired SOC is reached are obtained.

Finally, a pair of the OCV before start of auxiliary charge which is measured in step S101 and the amount of voltage change $\Delta V$ which is calculated in step S105 are plotted, and a relational expression is calculated by applying first order approximation to these data pairs concerning a plurality of secondary batteries (S106). The relational expression thus calculated is stored in the charge termination condition storing unit 18 of the auxiliary charger 10 as described above.

Figure 3:
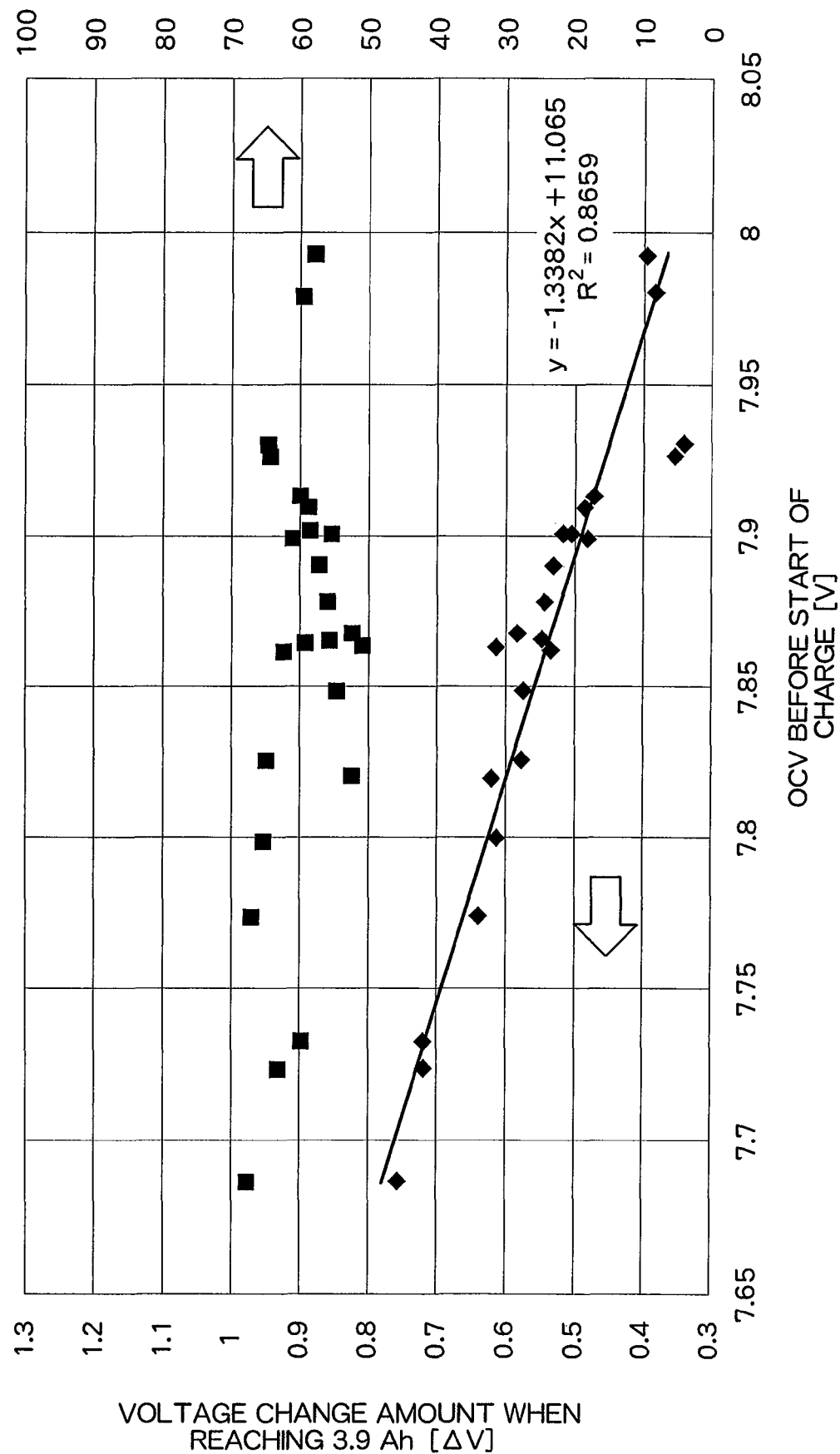
FIG. 3 is a graph illustrating a relationship between OCV and an amount of voltage change ΔV at the time of auxiliary charge of SOC 60%.

FIG. 3 illustrates an example relational expression calculated by the processing flowchart of FIG. 2. In this example, the desired SOC is set to SOC=60%. In FIG. 3, the horizontal axis indicates the OCV before start of auxiliary charge, and the vertical axis on the left side indicates an amount of voltage change $\Delta V$ until 3.9 Ah (corresponding to SOC=60%) is reached. The conditions for each plot point are as follows:

(1) Store at 25° C. and auxiliary charge at 25° C.
(2) Store at 25° C. and auxiliary charge at 30° C.
(3) Store at 25° C. and auxiliary charge at 20° C.
(4) Store at 25° C. and auxiliary charge at 35° C.
(5) Store at 25° C. and auxiliary charge at 15° C.
(6) Store at 45° C. and auxiliary charge at 25° C.
(7) Store at 0° C. and auxiliary charge at 25° C.

By applying first-order approximation by means of a least square method to the data pairs obtained by storing the secondary batteries under various temperature conditions and performing auxiliary charge as described above, the following can be obtained:

$$y=-1.3382x+11.065$$

wherein y is an amount of voltage change $\Delta V$, and x is an OCV (before start of charge), and a correlation coefficient of $R^2=0.8659$ can be obtained.

When compared with the conventional relational expression between the OCV and the SOC, it can be understood that the above relational expression can provide a higher degree of correlation.

Further, the vertical axis on the right side of FIG. 3 illustrates an actual SOC value at the time of termination of auxiliary charge when adapting the voltage value before start of auxiliary charge to the approximation formula, to thereby control the auxiliary charge. The actual SOC values after termination of the auxiliary charge fall within the range of 50.6% to 67.8%, and it is possible to perform auxiliary charge to a desired SOC with higher accuracy than the prior art, irrespective of the storage temperature or the temperature at the time of auxiliary charge.

Figure 4:
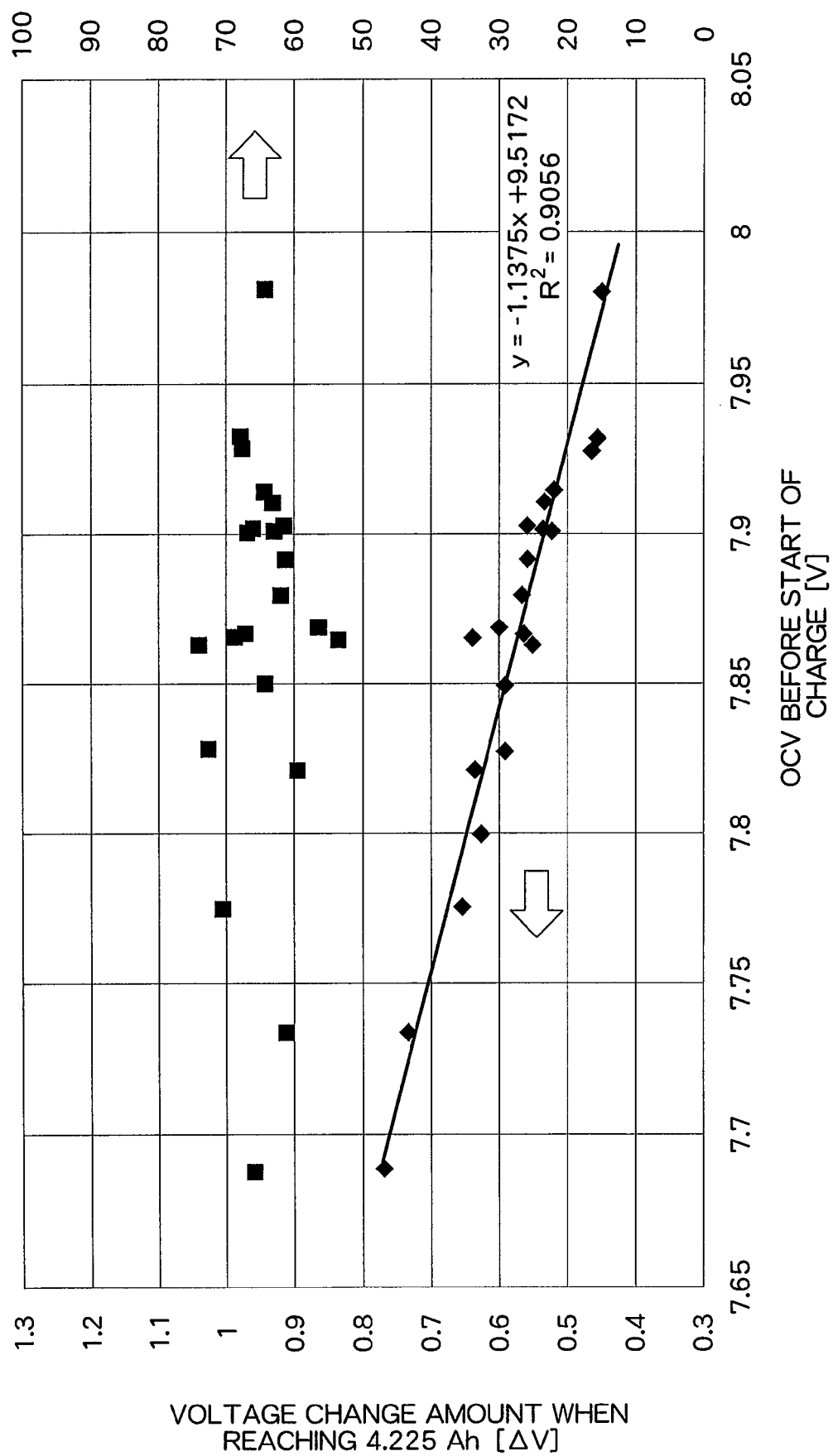
FIG. 4 is a graph illustrating a relationship between an OCV and an amount of voltage change ΔV at the time of auxiliary charge of SOC 65%.

FIG. 4 illustrates another example relational expression calculated by the processing flowchart of FIG. 2. In this example, the desired SOC is set to SOC=65%. In FIG. 4, the horizontal axis indicates an OCV before start of auxiliary charge, and the vertical axis on the left side indicates an amount of voltage change $\Delta V$ until 4.225 Ah (corresponding to SOC=65%) is reached. The conditions for each plot point are as follows:

(1) Store at 25° C. and auxiliary charge at 25° C.
(2) Store at 25° C. and auxiliary charge at 30° C.
(3) Store at 25° C. and auxiliary charge at 20° C.
(4) Store at 25° C. and auxiliary charge at 35° C.
(5) Store at 25° C. and auxiliary charge at 15° C.
(6) Store at 45° C. and auxiliary charge at 25° C.
(7) Store at 0° C. and auxiliary charge at 25° C.

By applying first-order approximation by means of a least square method to the data pairs obtained by storing the secondary batteries under various temperature conditions and performing auxiliary charge as described above, the following can be obtained:

$$y=-1.1375x+9.5172$$

wherein y is an amount of voltage change $\Delta V$, and x is an OCV (before start of charge), and a correlation coefficient of $R^2=0.9056$ can be obtained.

When compared with the conventional relational expression between the OCV and the SOC, it can be understood that the above relational expression can provide a still higher degree of correlation.

Figure 5:
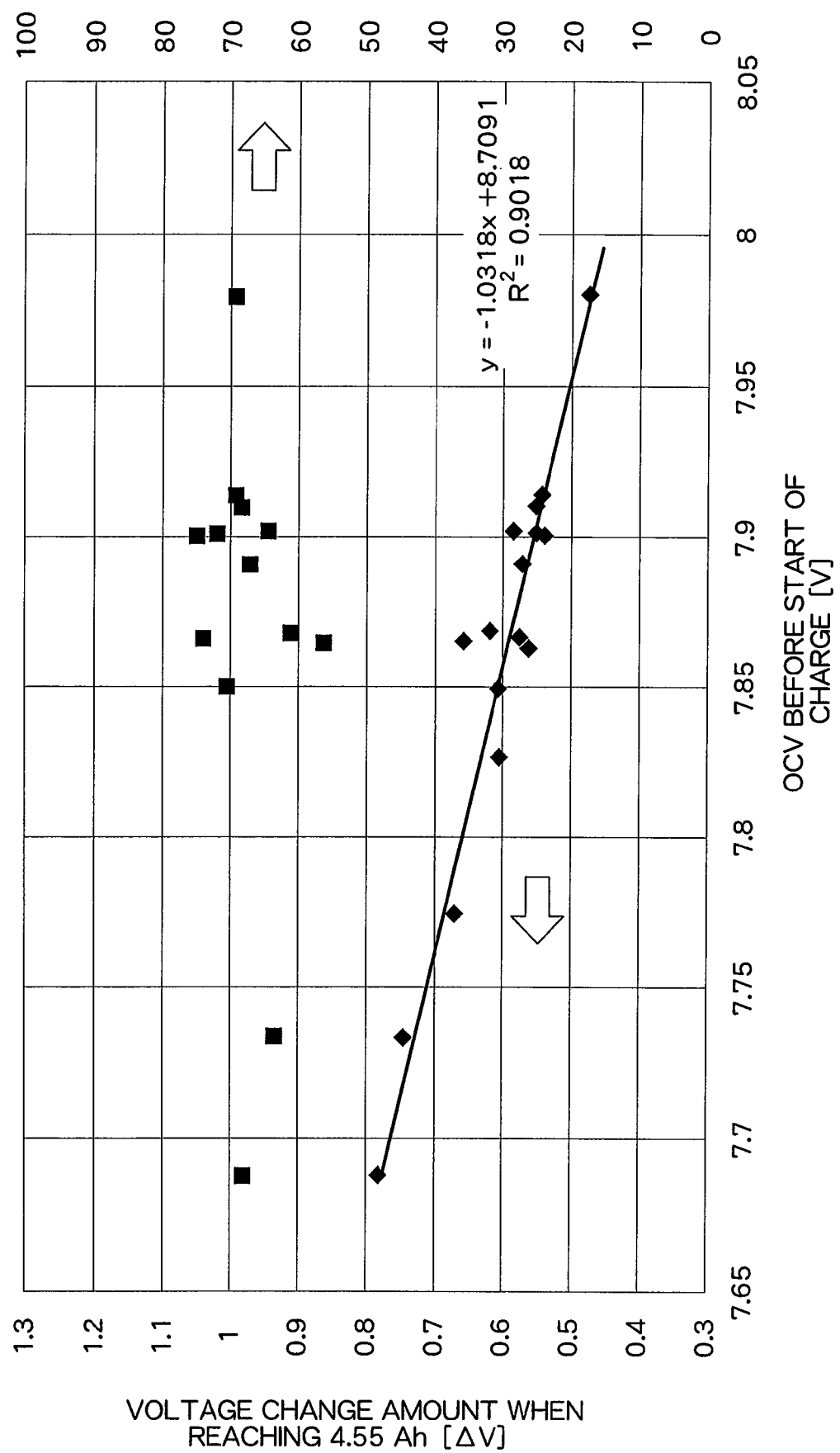
FIG. 5 is a graph illustrating a relationship between an OCV and an amount of voltage change ΔV at the time of auxiliary charge of SOC 70%.
Figure 6:
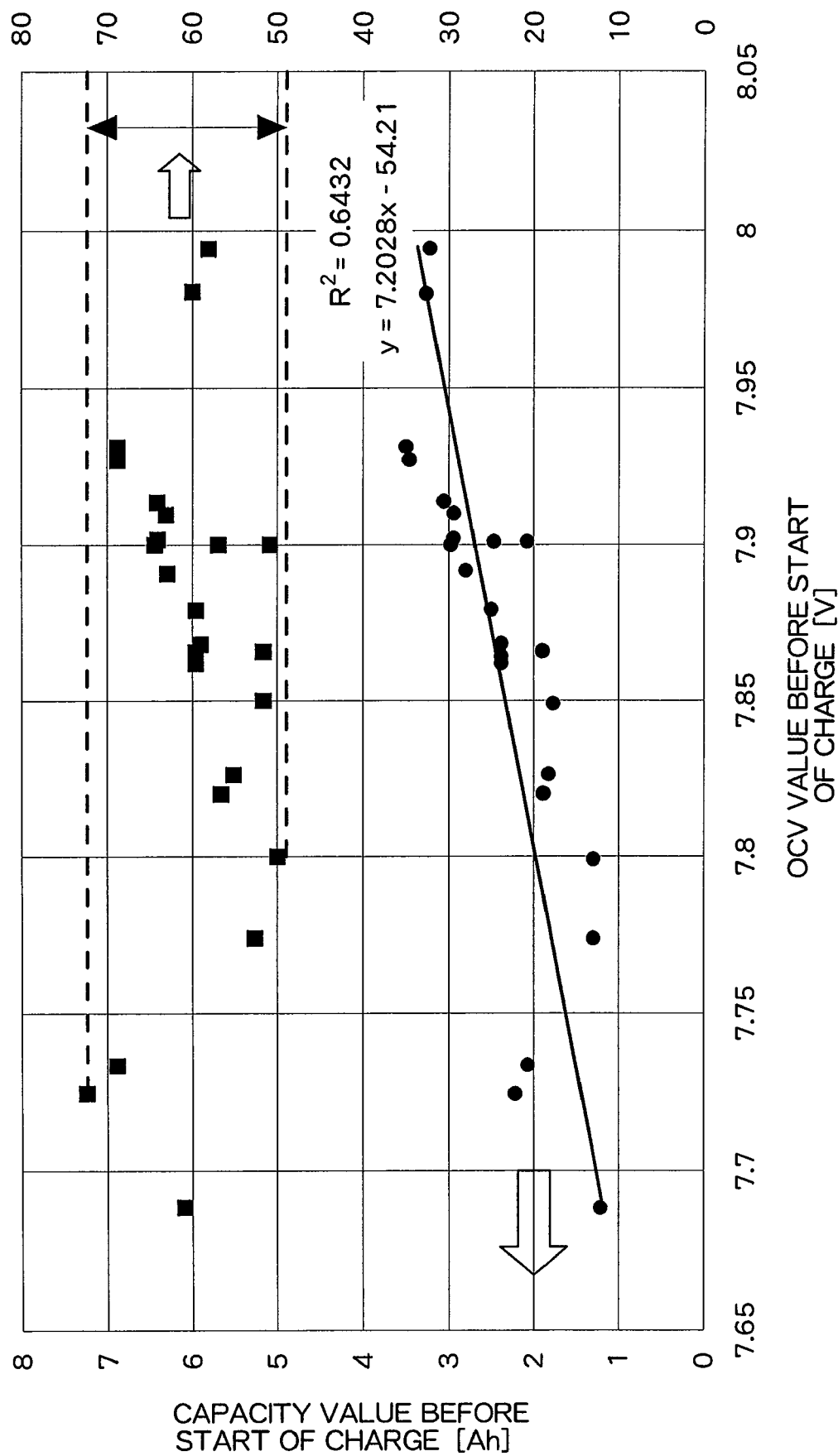
FIG. 6 is a graph illustrating a relationship between an OCV and an SOC.
Figure 7:
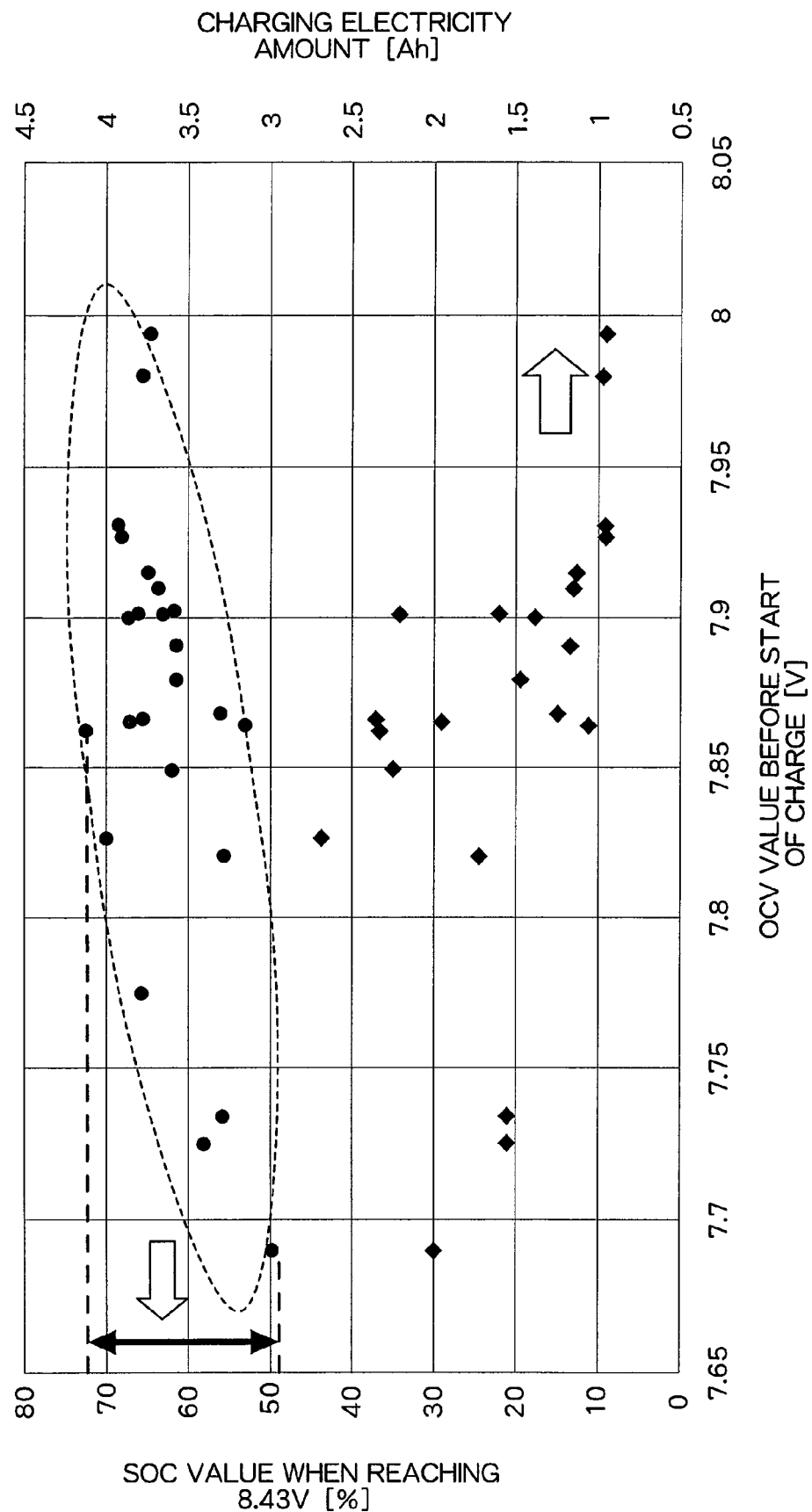
FIG. 7 is a graph illustrating a relationship between an OCV and an actual SOC at the time of reaching a desired terminal voltage.
Figure 8:
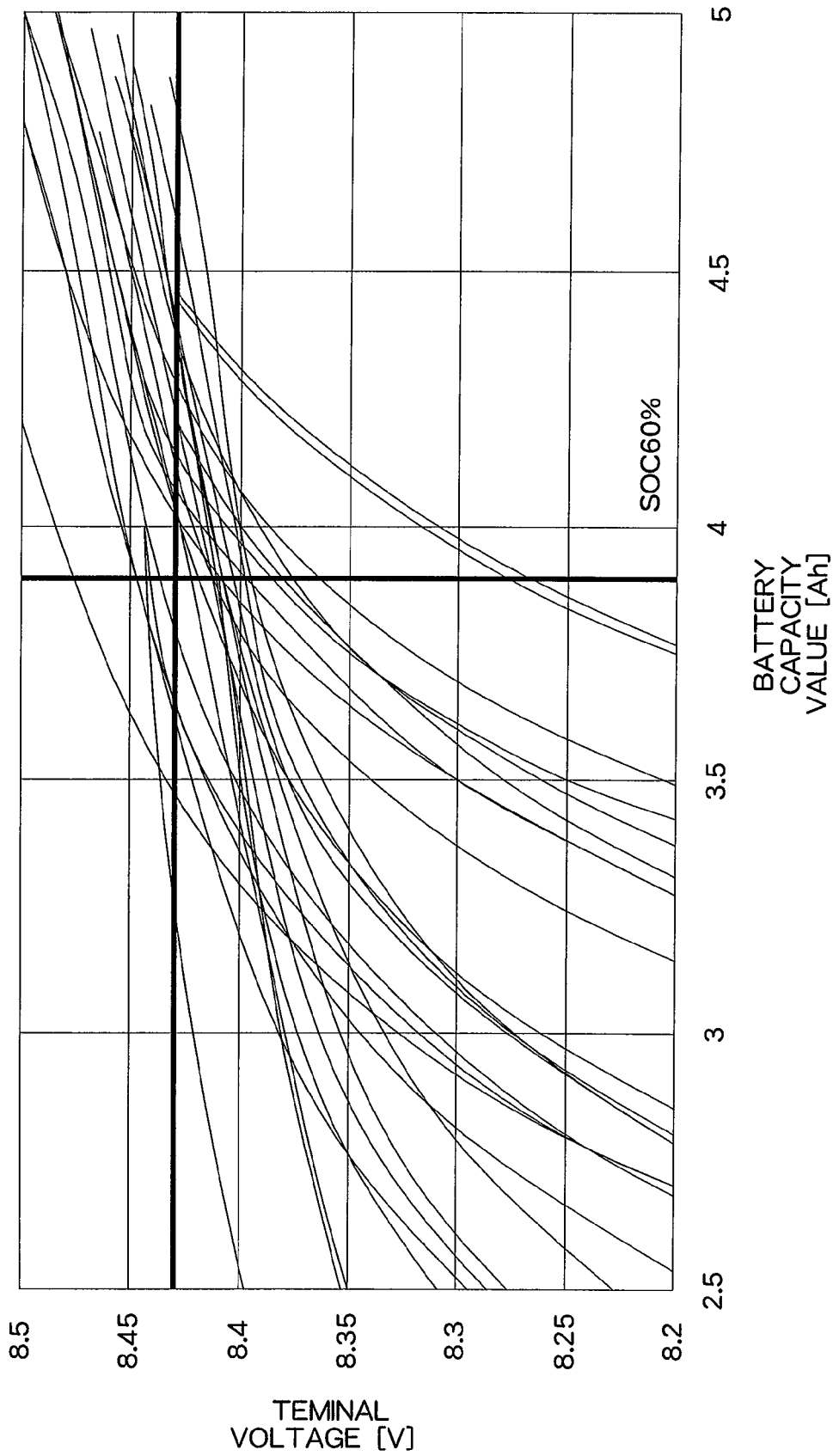
FIG. 8 is a graph illustrating a relationship between an SOC and a terminal voltage.

FIG. 5 illustrates a further example relational expression calculated by the processing flowchart of FIG. 2. In this example, the desired SOC is set to SOC=70%. In FIG. 5, the horizontal axis indicates an OCV before start of auxiliary charge, and the vertical axis on the left side indicates an amount of voltage change ΔV until 4.55 Ah (corresponding to SOC=70%) is reached. The conditions for each plot point are as follows:

(1) Store at 25° C. and auxiliary charge at 25° C.
(2) Store at 25° C. and auxiliary charge at 30° C.
(3) Store at 25° C. and auxiliary charge at 20° C.
(4) Store at 25° C. and auxiliary charge at 35° C.
(5) Store at 25° C. and auxiliary charge at 15° C.
(6) Store at 45° C. and auxiliary charge at 25° C.
(7) Store at 0° C. and auxiliary charge at 25° C.

By applying first-order approximation by means of a least square method to the data pairs obtained by storing the secondary batteries under various temperature conditions and performing auxiliary charge as described above, the following can be obtained:

$$y=-1.0318x+8.7091$$

wherein y is an amount of voltage change ΔV, and x is OCV (before start of charge), and a correlation coefficient of $R^2=0.9018$ can be obtained.

When compared with the conventional relational expression between OCV and SOC, it can be understood that the above relational expression can provide an even higher degree of correlation.

As described above, according to the present embodiment, attention is focused on a higher correlation existing between the OCV before start of auxiliary charge and an amount of voltage change until the desired SOC is reached, irrespective of the storage temperature and the temperature at the time of auxiliary charge, and the secondary battery is auxiliarily charged by using this relationship, so that high accuracy auxiliary charge can be performed. Further, according to the present embodiment, in which it is only necessary to compare the terminal voltage V and the target terminal voltage Vmap of the secondary battery during the auxiliary charge, the advantage that control at the time of auxiliary charge can be simplified can also be achieved.

Here, the present invention is not limited to the above embodiment, and various changes can be made. For example, while in the above embodiment the relationship between the OCV before start of charge and the amount of change of the terminal voltage until the desired SOC (SOC=60%) is reached is stored in the form of a map or a first order approximation formula in the charge termination condition storing unit 18 of the auxiliary charger 10, the desired SOC can be 65% or 70%, rather than 60%, depending on the secondary battery 32. Accordingly, it is also possible to configure such that a map or a first-order approximation formula for each desired SOC has been stored in the charge termination condition storing unit 18 so that the user can select the map or first-order approximation formula in accordance with the desired SOC, as appropriate. Specifically, the respective first-order approximation formulas illustrated in FIGS. 3, 4, and 5 can be stored in the charge termination condition storing unit 18.

Further, in the above embodiment, when calculating the relationship between the OCV before start of charge and the amount of change ΔV of the terminal voltage until the desired SOC (SOC=60%) is reached, auxiliary charge is performed under various temperature conditions, with respect to a plurality of secondary batteries stored at various storage temperatures conditions. However, it is also possible to calculate the above-described relationships by using a plurality of secondary batteries for which the fixed temperature is maintained at the time of auxiliary charge and only the storage temperatures are varied. In this case, auxiliary charge with a higher accuracy can be achieved. The applicant of the present application has confirmed that a variation of actual SOC after auxiliary charge is reduced to a range of 52.1% to 67.8% when the temperature at the time of auxiliary charge is limited to 20° C. to 30° C.

As described above, the relationship between the OCV before start of charge and the amount of change ΔV of the terminal voltage until the desired SOC (SOC=60%) is reached, which is stored in the charge terminal condition storing unit 18, can be created using one of the following methods:

(1) with respect to a plurality of secondary batteries which were stored at various storage temperatures, auxiliary charge is performed under various temperature conditions; and (2) with respect to a plurality of secondary batteries which were stored at various storage temperatures, auxiliary charge is performed under fixed temperature conditions.

The storage temperature can vary depending on whether the temperature management is performed at the storage location after shipment, or depending upon seasonal factors, such as summer and winter. Further, it is difficult to know in advance the storage temperature at which a secondary battery to be auxiliarily charged has been stored, at the time of auxiliary charge. On the other hand, there is a possibility that the temperature at the time of auxiliary charge can be controlled by a user to a certain degree. It is therefore preferable to use the above method (2) when the temperature at the time of auxiliary charge can be controlled, and otherwise use the above method (1). It is also possible to store the relationship in both cases (1) and (2) in the charge termination condition storing unit 18 so that a user can select either method as desired in accordance with whether or not the temperature control at the time of auxiliary charge can be performed.

What is claimed is:

1. A method of controlling charge of a secondary battery, comprising:
    measuring an open circuit voltage OCV of the secondary battery before start of charge;
    calculating a target terminal voltage Vmap based on a relationship between open circuit voltages OCV of a plurality of secondary batteries and an amount of change of terminal voltage ΔV until a desired state of charge SOC is reached, which is previously created and stored in a memory, and the open circuit voltage OCV which is measured;
    starting charge of the secondary battery;
    comparing a terminal voltage Vb of the secondary battery after start of charge of the secondary battery with the target terminal voltage Vmap; and
    continuing the charge until the terminal voltage Vb of the secondary battery reaches the target terminal voltage Vmap, and terminating the charge when the terminal voltage Vb of the secondary battery reaches the target terminal voltage Vmap.

2. The method according to claim 1, wherein
    the target terminal voltage Vmap is calculated by adding the amount of change of terminal voltage ΔV corresponding to the open circuit voltage OCV which is measured, to the open circuit voltage OCV which is measured.

3. The method according to claim 1, wherein
    the relationship is created by using a plurality of secondary batteries stored under various temperature conditions.

4. The method according to claim 1, wherein
the relationship is created by charging a plurality of secondary batteries stored under various temperature conditions to a desired state of charge SOC under different temperature conditions, respectively.

5. A charger for charging a secondary battery, the charger comprising:
- a storage unit which stores a relationship between open circuit voltages OCV of a plurality of secondary batteries and an amount of change of terminal voltage $\Delta V$ until a desired state of charge SOC is reached, which is previously created;
- an operation unit which calculates a target terminal voltage Vmap based on an open circuit voltage OCV before start of performing auxiliary charge of the secondary battery and the relationship stored in the storage unit;
- a unit which compares a terminal voltage Vb of the secondary battery after start of the charge with the target terminal voltage Vmap; and
- a control unit which continues charge until the terminal voltage Vb of the secondary battery reaches the target terminal voltage Vmap, and terminates the charge when the terminal voltage Vb of the secondary battery reaches the target terminal voltage Vmap.

6. The charger according to claim 5, wherein
the operation unit calculates the target terminal voltage Vmap by adding the amount of change of terminal voltage $\Delta V$ corresponding to the open circuit voltage OCV, to the open circuit voltage OCV.

7. The charger according to claim 5, wherein
the relationship is created by using a plurality of secondary batteries stored under various temperature conditions.

8. The charger according to claim 5, wherein
the relationship is created by charging a plurality of secondary batteries stored under various temperature conditions to a desired state of charge SOC under different temperature conditions, respectively.

* * * * *